April 9, 1929.  W. M. ROBERTS  1,708,899
ICE CREAM CONE MACHINE
Filed Feb. 20, 1925  6 Sheets-Sheet 1

INVENTOR
WEBSTER M. ROBERTS
By Toulmin & Toulmin
ATTORNEYS

April 9, 1929.  W. M. ROBERTS  1,708,899
ICE CREAM CONE MACHINE
Filed Feb. 20, 1925  6 Sheets-Sheet 2
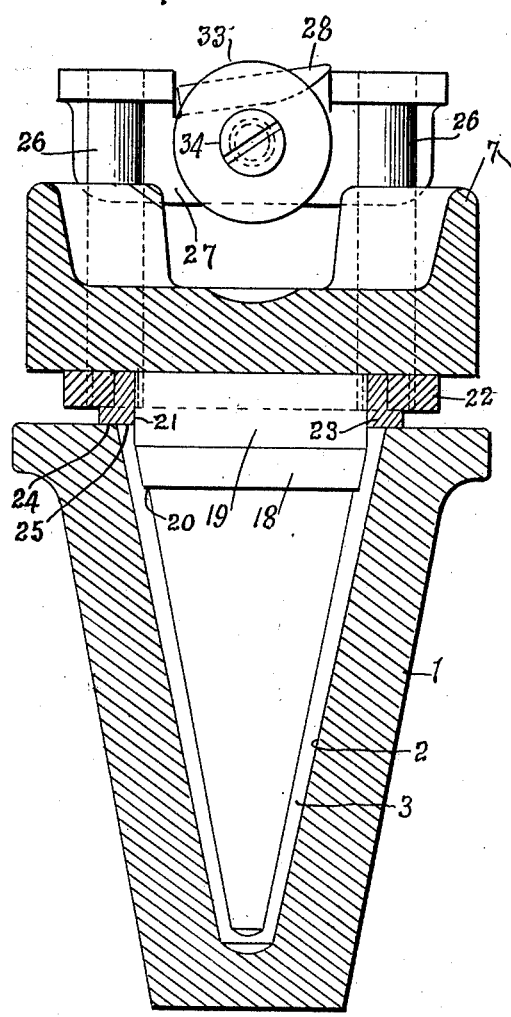
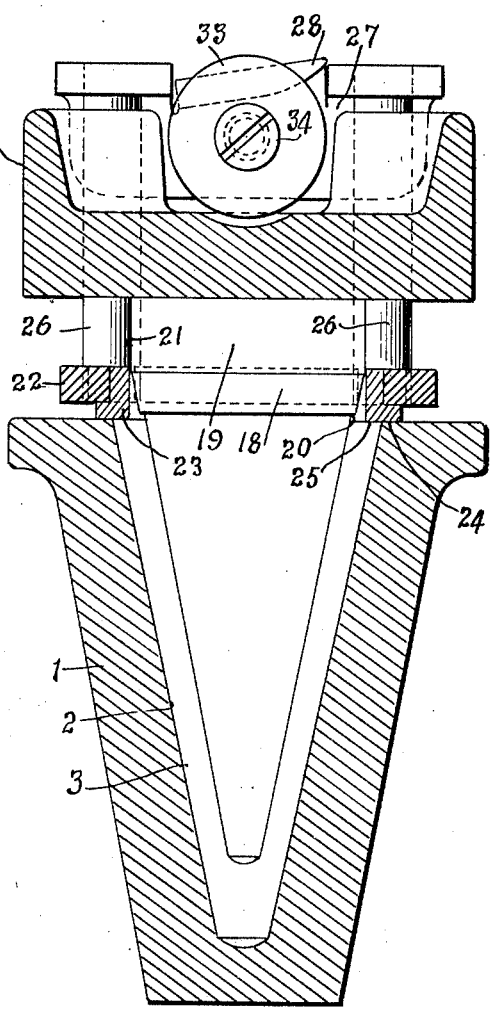
INVENTOR
WEBSTER M. ROBERTS,
By Toulmin & Toulmin,
ATTORNEYS April 9, 1929.  W. M. ROBERTS  1,708,899
ICE CREAM CONE MACHINE
Filed Feb. 20, 1925   6 Sheets-Sheet 3
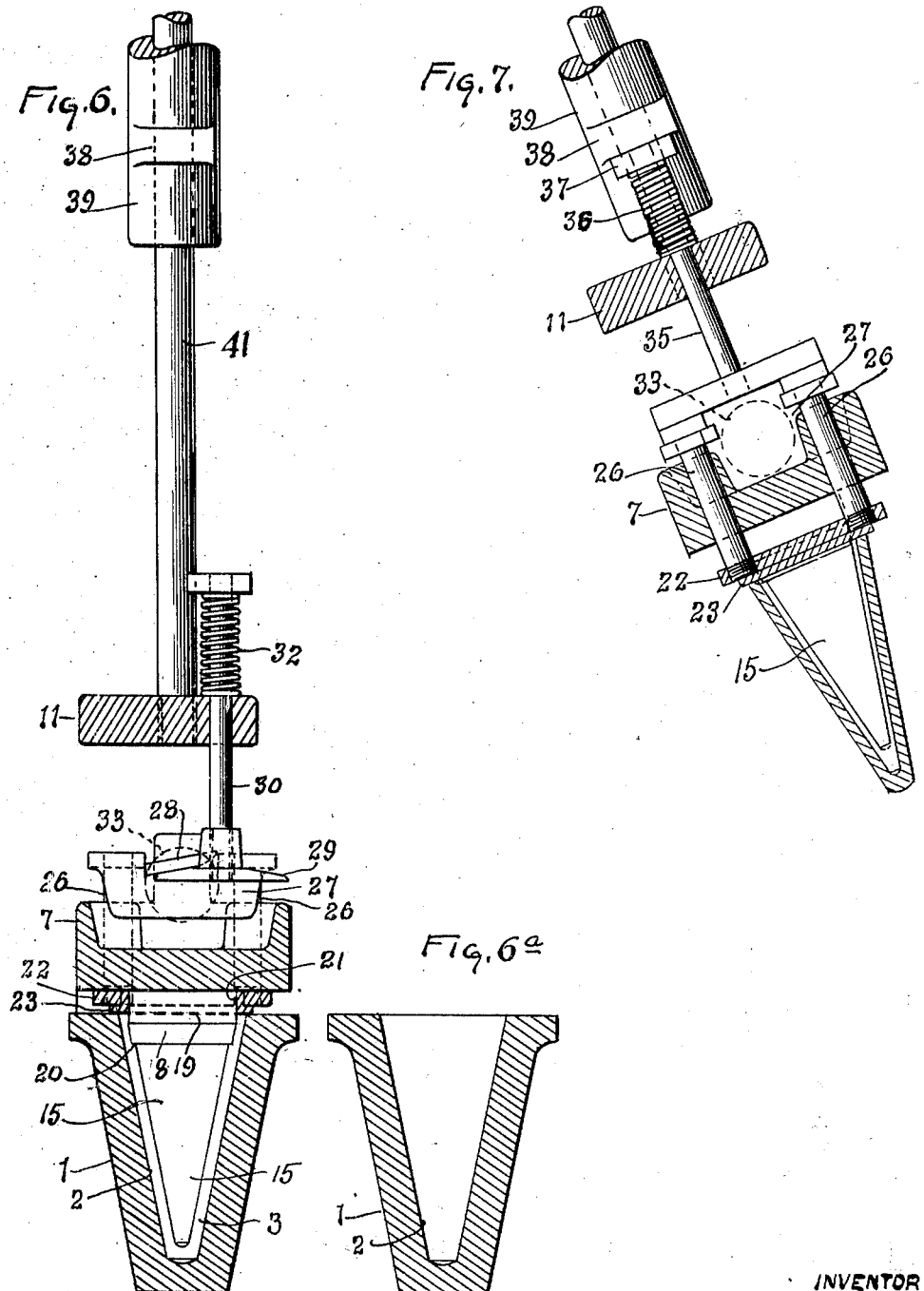
INVENTOR
WEBSTER M. ROBERTS,
By Toulmin & Toulmin
ATTORNEYS April 9, 1929.  W. M. ROBERTS  1,708,899
ICE CREAM CONE MACHINE
Filed Feb. 20, 1925  6 Sheets-Sheet 4

INVENTOR
WEBSTER M. ROBERTS,

By Toulmin & Toulmin
ATTORNEYS

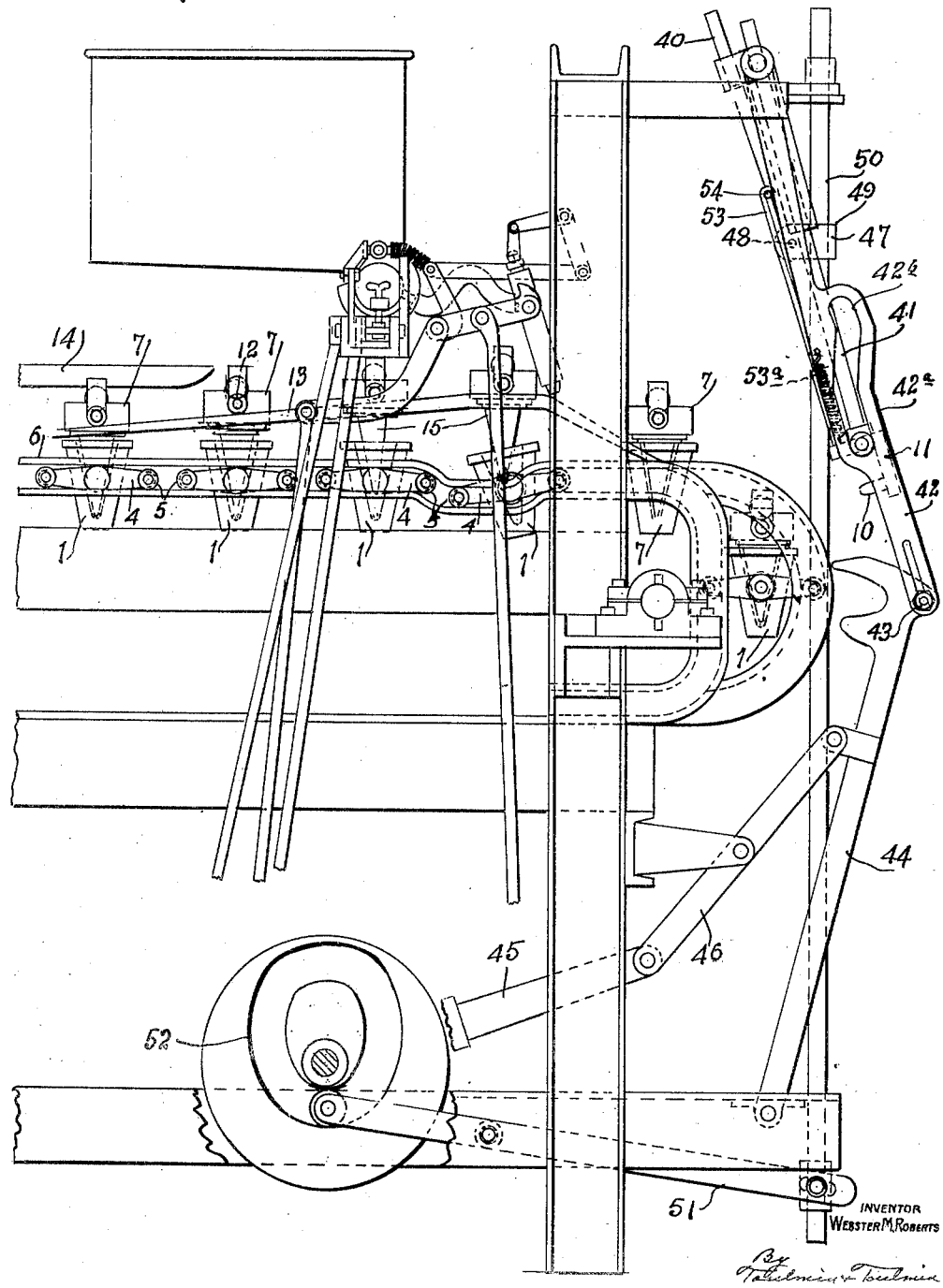

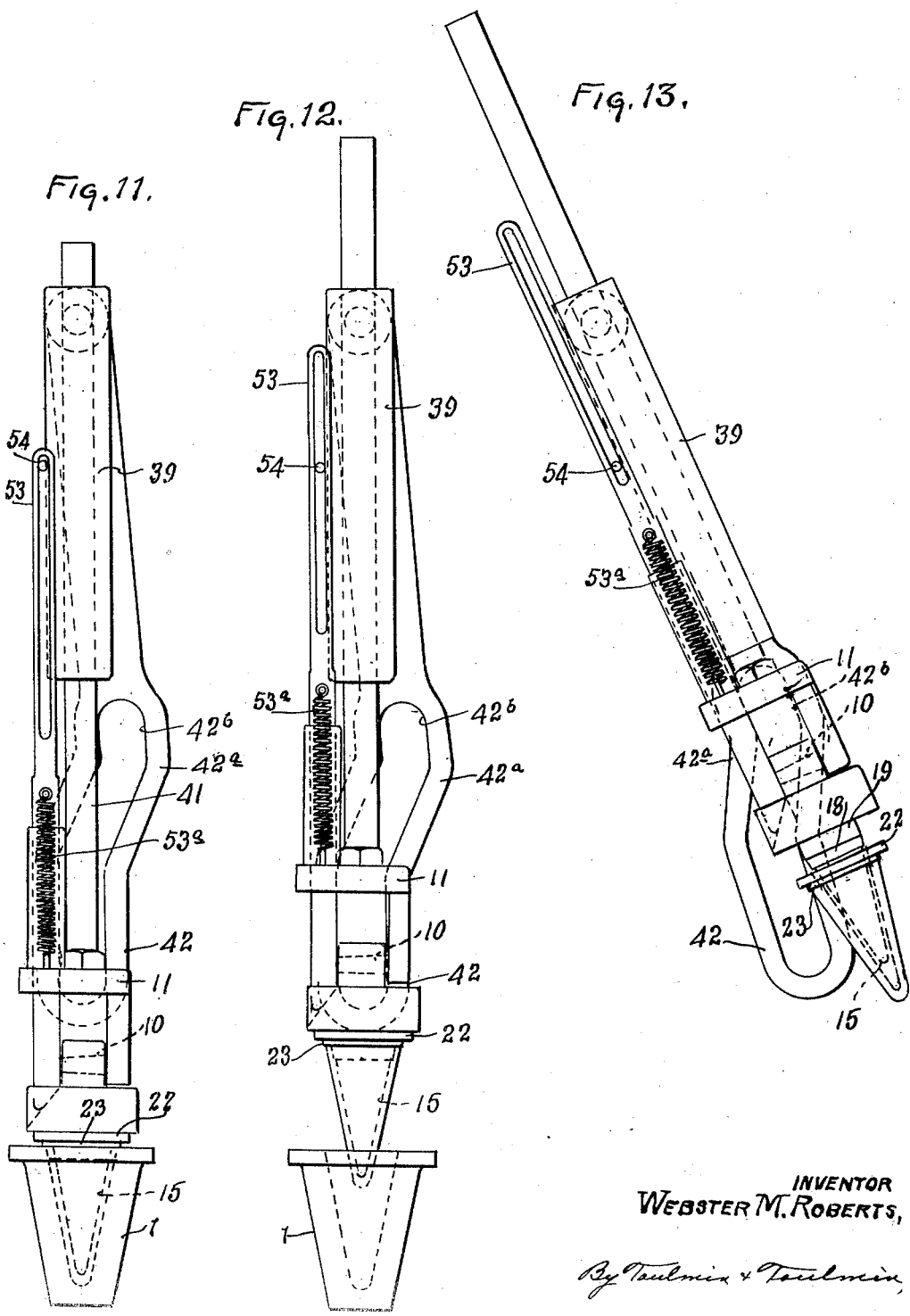

Patented Apr. 9, 1929.

1,708,899

UNITED STATES PATENT OFFICE.

WEBSTER M. ROBERTS, OF ST. JOSEPH, MISSOURI, ASSIGNOR TO ROBERTS CONE MANUFACTURING COMPANY, A CORPORATION OF MISSOURI.

ICE-CREAM-CONE MACHINE.

Application filed February 20, 1925. Serial No. 10,473.

This invention relates to improvements in machines for automatically manufacturing pastry articles, particularly those commonly known as ice cream cones, an edible product made from a sweetened flour batter and largely sold in confectioneries and other sales places which cater to the public at popular resorts, such as the seashore, mountain resorts and places of amusement.

In the machine in which this invention is embodied and used the molds which contain the cavities for receiving the batter which is to be shaped into a cone and baked are what is known as solid molds, meaning molds in which the cavities are made in one piece as distinguished from making the cavities partly in one half and partly in the other half of the two-part mold. In two-part molds the parts close to receive the batter and after the baking operation, open to discharge the product. In the case of closed or so-called "solid" molds the body of the mold is not made in halves but in one integral piece and the mold cavities are formed in this piece.

Associated with and cooperating with these cavities are what is known as cores, being a series of tapered projections carried by a core-bar and adapted to be inserted into the mold cavities to act as cores to form the interior of the hollow cones which are to be baked, and to be removed from the cavities with the baked product or cones impaled on them from which they are stripped.

My present invention is in the nature of an improvement upon that branch of the cone-making machine for which Park D. Roberts and myself were granted Letters Patent No. 1,551,056, August 25, 1925, which relates to the cores and the stripper plate utilized to dislodge the cones from the cores.

In this connection the object of the present invention is to prevent the spluttering out of the batter from the mold cavities by bringing the stripper plate down on the top of the mold before the core bar reaches the mold face. In this way the stripper plate is made to act as a seal to keep the batter within the cavities before and while the cores are descending into the mold cavities.

Another object of the present invention is to provide the stripper plate with narrow circular shoulders which are the parts, instead of the whole surface of the plate, that come down upon the top of the mold while the cores are yet descending into the cavities. These narrow circular shoulders, because of their limited width, present a narrow area of contact with the face of the mold as compared with the area of the plate, so that the thin fin of batter which works from within out to and between the mold face and the annular shoulders is restricted to not only a fin but a narrow film. For this reason the steam which works out of the mold cavities after the cores are fully down in the cavities has but a short distance, measured laterally, to penetrate through this film. At that time this narrow film of batter has not become cooked but is yet in a plastic state.

Therefore, it will be seen that by reducing the area of the contact between the mold top and the plate, through the provision of this narrow annular shoulder, only a narrow film of batter will form, whereby a shorter distance is afforded through which the steam can the more readily work itself out. This gives greater freedom to the exit of the steam, and also forms a very thin flat ring in the fin or batter overflow around the top edge of the cone, which breaks off very easily and leaves the cone with a finished top edge.

Another feature of improvement embodied in the present invention is so positioning the annular shoulder on said stripper plate that one part of the shoulder will overlap the mold face and another part overlap the open ends of the mold cavities, which latter overlapping forms ledges which overhang the mold cavities and fit over the upper ends of the cones so as to be in position to press upon the cones and strip them from the cores when and at the time in the operation of the machine the stripper plates are given a movement relative to the core bar and against the cones.

A further feature of the present invention relates to means for lifting the stripper plate concurrently with the lifting of the core bar, so that both plate and bar will travel together without relative movement during the withdrawal of the cores, with the impaled cones, from the mold cavities, and will continue in such relatively fixed position until certain associated knocker-devices act to move the stripper plate relatively to the core bar to cause the plate to strip the cones from the cores.

The foregoing and other features hereinafter stated in detail constitute the essentials of the present invention.

In the accompanying drawings:

Figure 4 is an enlarged detail view showing the core bar, stripper plate and mold in cross section and the cores and guides for the stripper plate in elevation.

Figure 5 is a like view showing the position of the parts when the cores are descending into the molds, at which time the stripper plate has moved into contact with the upper face of the mold in advance of the final positioning of the cores.

Figure 6 is a partial sectional view and elevation of the mold, stripper plate and core bar, and the means for lifting the stripper plate in unison with the lifting of the core bars.

Figure 6ª is a sectional view representing a mold which while in the machine will be on its way to reach a position at which the then elevated and stripped cores can, on their return, enter the mold.

Figure 7 is a partial sectional view and elevation showing the parts in the act of acting to strip the cones from the cores.

Figure 8:
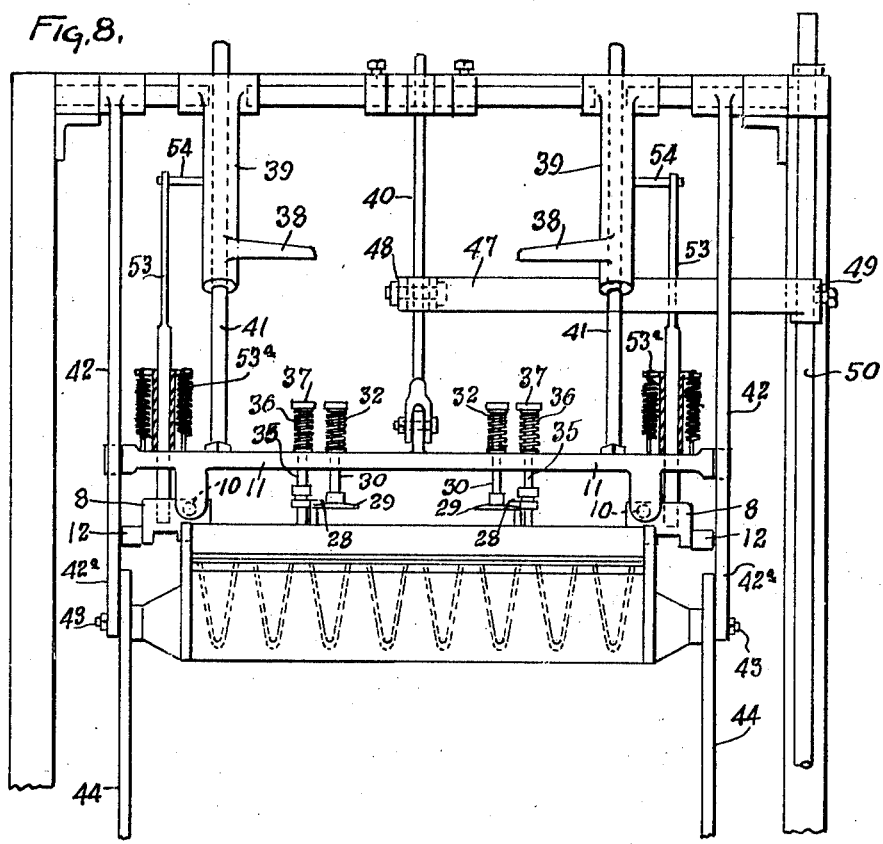

Figure 8 is a front elevation of parts of the machine frame, the mold, core bar, stripper plate and mechanism for lifting the core bar and plate simultaneously and for later acting on the stripper plate to make it strip the cones from the cores; and incidentally showing various details.

Figure 9:
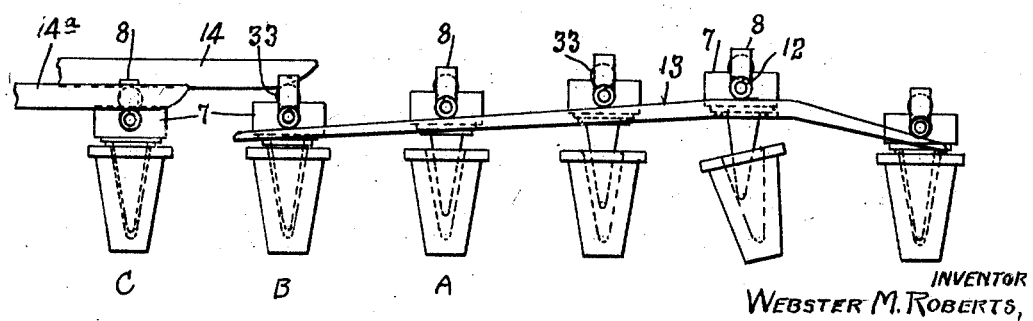

Figure 9 is a view in the nature of a diagram showing the partial elevation and return of the cores during the period when fresh batter is being supplied to the molds during which time the principal portion of the resulting steam may escape, and showing also the means for finally reseating the cores in the molds to begin the baking operation.

Figure 10 is an enlarged side elevation of one end of the machine showing generally how the molds and core bars are carried on an endless chain in circuits through the machine; how the molds are held stationary while the cores with their impaled cones are to be withdrawn from the molds; and how batter is introduced into the molds with the cores partially elevated for that purpose.

Figure 11 is an enlarged detail view showing the means by which the core bars are appropriately guided during the movement of the cores out of and from the molds.

Figure 12 shows the same mechanism with the position of the parts changed to that which they occupy when the withdrawal of the cores from the molds is nearly completed.

Figure 13 is a further view of the same mechanism showing the position of the core bar, its stripper plate and the cores at the time the stripping of the cones is taking place.

I shall first set forth a description of the features which constitute the present invention and then refer to the mechanism illustrated in the accompanying drawings for putting them into operation and which mechanism is illustrative merely, as other forms of mechanism for putting into practical use the features of this invention may be employed.

Referring particularly to Figures 1 to 7, the numeral 1 indicates the mold which comprises a bar of metal in which is formed a series of mold cavities as indicated at 2 in Figures 4 and 5. These cavities correspond in number and shape with the cores but are slightly larger than the cores in order to give an intervening space, indicated at 3, to be occupied by the batter which, when baked, is to constitute the cone.

Figure 1:
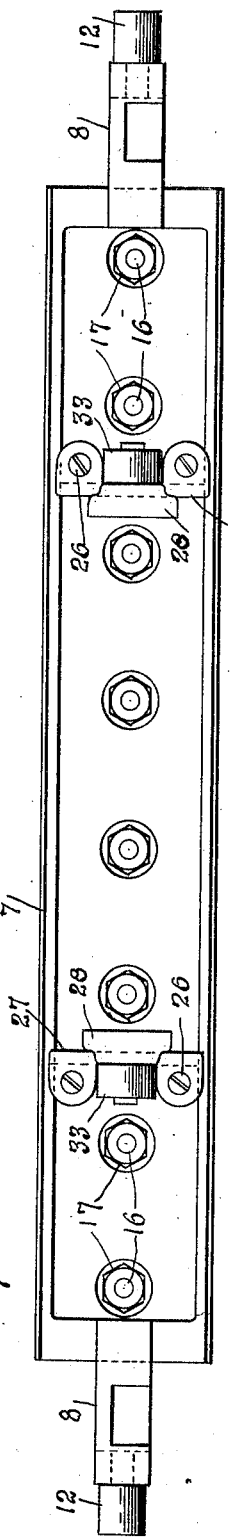
Figure 1 is a plan view of a core bar and mold embodying my invention.
Figure 2:
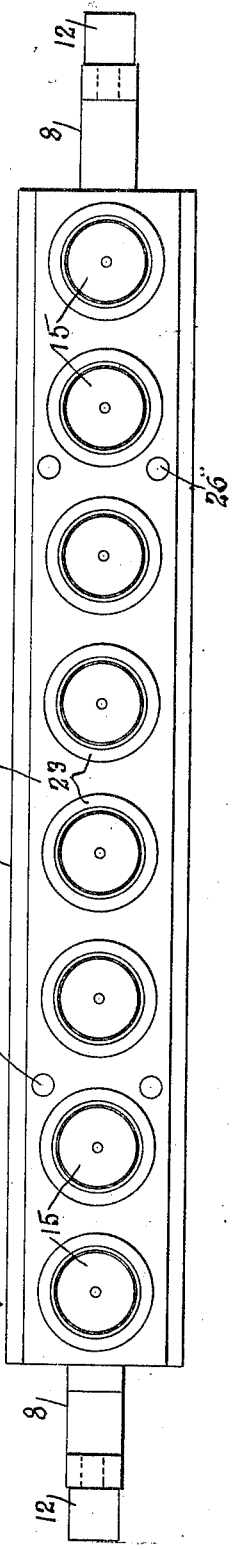
Figure 2 is a plan view of the core bar inverted, showing the cores from their points to their larger ends.
Figure 3:
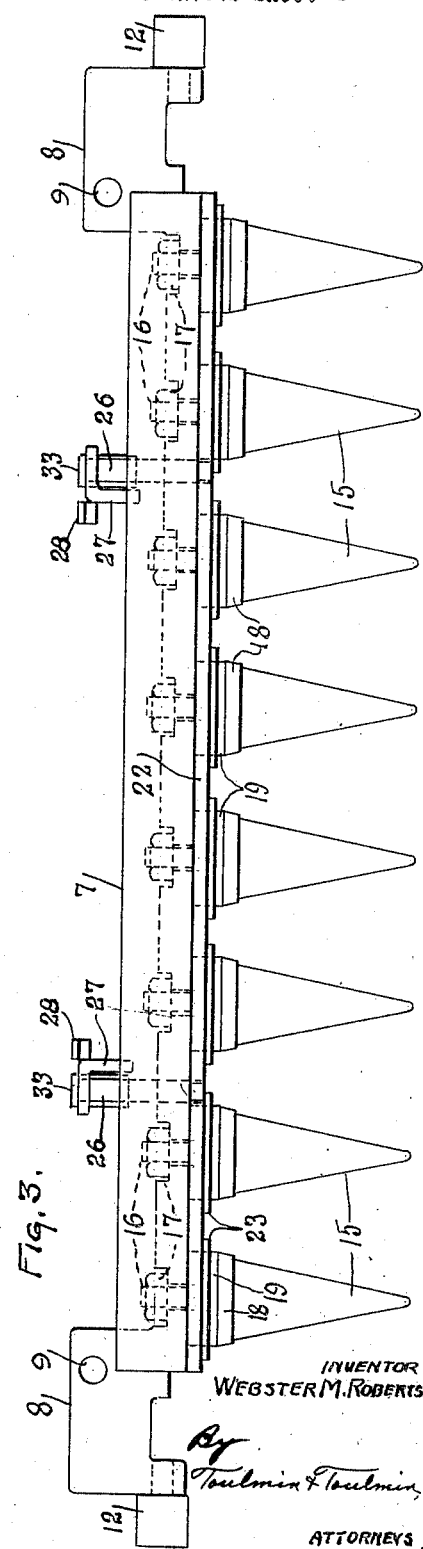
Figure 3 is a side elevation of the core bar and cores.

This mold is to be mounted in a general machine, as indicated in Figure 10, where it is shown that the molds are equipped with arms 4 having rollers 5 which travel in tracks 6 and are actuated by an endless chain and drum mechanism such as shown for instance in Figure 1 of Patent 1,423,258, dated July 18, 1922, and granted to myself and Park D. Roberts.

Associated with each mold is a core bar or support indicated at 7 and provided with extensions 8 having holes 9 for the entrance of pins such as 10 (see Fig. 10) projecting from the core lifting bar 11 and operable as hereinafter stated so that at the time when the cores are to be lifted out of the molds, with the cones impaled on the cores, the core bars may be quickly elevated and positioned for the stripping of the cones from the cores and be made to return and re-enter the molds. The extensions 8 also carry rollers 12 which afford anti-friction means for traveling on the cam track 13 (Fig. 10), utilized to lift the cores sufficiently out of the molds to allow the feeding of the batter to the molds and to permit the excessive steam to escape before the cores are finally seated; and the rollers 33 also similarly act against tracks 14 which act to press the stripper plate downward to seat it upon the molds in advance of the final positioning of the cores in the molds.

Further tracks 14ª operate to engage the rollers 12 on the ends of the core bar to finally seat the cores in the cavities of the mold. (See Figure 9.)

The several positions of a mold, a core bar and its cores as it travels along these tracks are shown in this figure. In position A the track 13 is functioning to hold the cores somewhat out of the molds during the time when the molds are fully steaming with the stripper plate and cores yet unseated.

In position B the track 14 is functioning to press the stripper plate down upon the mold while the core is still in the position with respect to the mold shown in position A. In position B the steaming is slight as the only escape is between the contact of the plate with the mold face.

In position C the track 14ᵃ is functioning to press the cores fully down to their final position in the mold cavities, at which time the steaming has ceased, the plate is in contact with the upper face of the mold and the core bar is fully down.

The cores are indicated at 15 and have screw-threaded shanks 16 which pass through the core bars and are held by nuts 17. These cores are fashioned with slightly enlarged neck portions indicated at 18 and 19 and best seen in Figures 4 and 5. The portion 18 of the neck forms a slight shoulder as seen at 20 in said figures and is tapered to properly configure the interior of the cone near its upper end, while the portion 19 is cylindrical to form a surface 21 upon which fits and slides the stripper plate 22 which performs the several functions of sealing the mold cavities at their open ends, providing an overhanging ledge across the open ends of the cones and of stripping the cones from the cores in the manner presently to appear.

The stripper plate 22 extends throughout the length of the core bar and has openings therein corresponding in position with the neck portions 19 of the cores. The plate has a portion 23 formed of a separate collar which fits within the openings in the plate or otherwise formed with respect to the plate. This collar is bored out to snugly fit on the cylindrical portion of the neck 19. The lower part of the collar constitutes an annular shoulder 24 which fits upon the upper surface of the mold and forms a ledge 25 which overhangs the opening in the top of the mold. The purpose of the annular shoulder is to constitute the restricted or narrow line of contact with the mold top so as to form a very narrow fin of such batter as will inevitably work itself between the mold top and this shoulder, whereby whatever steam still remains in the mold cavity after the stripper plate has been seated against the mold may still work itself out the more readily because of the narrow line of contact this shoulder forms between the mold top and the stripper plate, as compared with what would be the extent of this contact if the whole stripper plate came down and fitted upon the mold top, and will also provide a very thin flat ring in the batter overflow so that the sheet formed from this overflow batter will readily break off from the baked cone.

The function performed by the ledge portion 25 is that of closing the mold cavity all around the core or neck portion 19 and at the same time affording contact between the stripper plate and the upper open end of the cone so that the stripper plate may strip the cone from the core in the manner presently to appear.

These features of the stripper plate being so fashioned as to seal the top of the mold cavity by a narrow margin of contact and as to from a ledge closing the space between the core and the wall of the cavity and overlying the end of the cone are important features of my invention because they perform the highly useful purposes stated, that is to say, the part which overlaps the mold face while forming a seal limits the the width of any fin formed between the surfaces by a film of batter, and the part which overhangs the cavity completes the sealing of the cavity and as well constitutes a provision for enabling the stripper plate to dislodge or strip the cone from the core.

This stripper plate is movably mounted on the core bar 7 by means of guides or posts 26 of which there are preferably four as shown in Figure 1. These posts are slidably mounted in the bar and are interconnected by a cross piece or yoke 27 which carries a cam plate 28 utilized in lifting the stripper plate together with the core bar from the mold and thereby withdrawing the cores with the baked cones impaled thereon.

The instrumentality by which this is done is best seen in Figures 6 and 8 and consists of a cam head 29 mounted on an extended pin 30. The cam head 29 is adapted to swing under the cam plate 28 and engage the under side thereof as seen in Figures 6 and 8. Then when the core bar lifter 11 is elevated by the means presently to be described the pin 30 is lifted because it passes through said bar and is equipped with a spring 32 located between the bar and the head on the pin. The purpose of the spring is to prevent a sudden jerk on the cam plate when the lifter bar is elevated. In practice, there will be at least two of these pins 30 and springs 32 as indicated in Figure 8. At 33 is shown an anti-friction roller mounted on a screw stud bearing 34 carried by the plate 27. The purpose of these rollers, one at either end of the bar, is to engage with the cam track 14, shown in Figure 10, to press the stripper plate down upon the mold, the core bar with its cores accompanying the plate.

It will now be seen that when the cam plates 28 are lifted in the manner just pointed out, the whole affair consisting of the stripper plate, core bar and cores will be elevated and withdrawn from the mold as clearly appears will be the case from Figures 6 and 8.

When the core bar with its attachments and with the cones impaled on the cores has reached the position, that shown in Figure 7, when the cones are to be dislodged or stripped from the cores, the stripper plate 22 must be thrust away from the core bar and against the cones. This movement of the stripper plate is effected by the stripper plate knocking pins 35 which are mounted slidably in the core bar lifter 11, each with a spring 36 between the bar and its head 37. The movement of the bar lifter 11 brings the heads 37 of these pins against knockers 38 in the nature of projections extending from sleeves 39 carried by the upper part of the general frame. The effect of this contact between the pin heads 37 and the knockers 38 is to force the pins 35 against the posts 26 and thus push the stripper plate 22 away from the core bar 7 and along the cores a sufficient distance to dislodge or strip the cones therefrom by the contact of the overhanging ledges 25 with the cones. In Figure 7 the parts are shown in the position which they occupy when this dislodgment of the cones is effected.

Referring to Figure 8 of the drawings I would state that it illustrates so much of a machine of the general character shown in the patent to Park D. Roberts and myself of July 18, 1922, No. 1,423,258, as may be used to carry and manipulate this solid mold and these core bar and stripper plate improvements, although the machine disclosed in that patent was for use in connection with separable molds or molds made in halves adapted to be brought together to form the cavities for the reception of the batter and cores and to be separated for discharging the cones.

In Figure 8 the core bar lifter 11 is raised and lowered by an actuating bar or pitman 40 itself operated in any convenient manner. The lifter bar is guided by guide rods 41 which travel in the sleeves 39 before referred to. These sleeves are pivotally hung from the upper part of the general frame. Positioning mechanism for the core bar lifter by which it is positioned to cause its lifting pins 10 to enter corresponding holes indicated at 9 in Figure 3, of the core bar, and to withdraw from those holes after the core bar has been lifted and returned to the mold forms no part of the present invention but consists essentially of swinging rods 42 and swinging cam plates 42$^a$, the latter connected at 43 with oscillating bars 44. These bars are actuated through suitable cams which act on pitmen 45 and levers 46. The cam slots 42$^b$ in the cam plate 42$^a$ serve to properly guide and position the swinging rods 42 when the pitman 40 is raised and lowered to raise and lower the core bar lifter 11. The pitman 40 is actuated through a rigid arm 47 secured at 48 to the pitman and at 49 to a vertically operated shaft 50 which itself is actuated by a lever 51 through a cam 52 as shown in Figure 10. The movements of the shaft 50 and the oscillating bars 44 are so related that the lifting pins 10 first swing over and enter the holes 9 in the core bar and then the lifting bar is actuated through the shaft 50 and the connecting parts, whereby the core bar is engaged by this mechanism, is lifted and swung to the position shown in Figure 7 in readiness to have the cones ejected from the cores by the mechanism already described.

Referring to the slotted rods 53, slidably mounted on the projections 54 extending from the sleeves 39 and to the spring equipment 53$^a$ carried by said rods, I would state that the general function of these parts is to hold the core bar on the pins 10. But as these features form no part of the present invention I do not deem it necessary to go into further details.

It will now be seen that my invention provides for reducing to the minimum the width of the thin fin formed between the mold face and the stripper plate, so that waste of the batter is likewise reduced and so that the steam which is in the mold cavities even after the cores are down in their appropriate place can the more readily issue because of the short distance of travel along the line of contact between the mold face and the stripper plate.

It will also be seen that I have provided an effective means of constituting a ledge which acts to close the mouth of the cavities when the cores are seated and further acts to press against the cones to strip them from the cores.

And it will be further observed that I have provided a very practical construction as between the core bar and the stripper plate so that the plate and the bar may readily move together and yet that the plate can at the proper time have a movement independent of the bar and its cores so as to act on the cones in stripping them from the cores.

And still further it will be noted from Figure 5 that the stripper plate comes down in advance of the final seating of the cores and final positioning of the core bar and contacts with the mold and forms the overhanging ledge to interrupt and largely prevent the batter from spluttering out during the period when the cores are pretty well down in the cavities but are not fully positioned down therein.

It will also be observed that the fit between the cylindrical portion 19 of the core necks and the stripper plate will prevent the escape of this spluttering batter due to the then heated condition of the mold, the only escape being slight and between the narrow portion 24 of the stripper plate where it overlaps the mold top. When the parts are in this relation, as shown in Figure 5, the space between the cores and the mold cavities is rather wide and ample for the accommodation of the required quantity of batter although at that time it is in a fluffy state as distinguished from being solidified. Then when the cores are pressed to final position as shown in Figure 4, they compress the fluffy batter into what may be called a solid state. This eliminates air holes or other cavities in the walls of the cones and makes the cones smooth and comparatively hard because the batter has been compressed from the thick wall shown in Figure 5 to the thin and normal thickness of wall shown in Figure 4. In this way what may be properly regarded as very perfect cones are produced.

Having thus fully described my invention, what I claim as new and desire to secure by Letters Patent, is:

1. In a cone-making machine, the combination with a core bar having cores and a stripper plate movably mounted on the bar, and having a cam plate, of means to lift against said plate comprising a cam head, a pin, and a core bar lifter on which the pin is yieldingly mounted, and means to actuate said lifter.

2. In a cone-making machine, the combination with a core bar having cores and a stripper plate having posts slidably mounted in the bar and having also a cam plate, of a pin having a cam head adapted to contact with said cam plate, a core bar lifter on which the pin is yieldingly mounted, a knocking pin to actuate the stripper plate relative to the core bar and a stop for the knocking pin.

3. In a cone-making machine, the combination with a core bar having cores and a stripper plate having posts slidably mounted in the bar and carrying a cam plate, of a core bar lifter, a stripping plate lifter carried by said bar lifter and having a cam head adapted to engage with said cam plate, and a stripper pin also carried by said bar lifter and adapted to engage said posts to move the plate relative to the bar to strip the cones, and a stop to contact with said stripper pin.

4. In a cone-making machine, the combination with a core bar lifter, of pins yieldingly supported thereon to act on a stripper plate to lift it and a core bar, and stripper pins also yieldingly carried by said bar and adapted to act on the stripper plate to move it relative to such core bar, and a stop or knocker to act on the stripper pin.

5. In a cone-making machine, the combination of a core bar having cores, a stripper plate having posts slidably mounted in said bar, a cam plate carried by the posts and a roller carried by the plate, such pins permitting the stripper plate to have movement relative to the bar and such roller adapted to operate in conjunction with a suitable cam track to seat the plate on a mold.

6. In a cone-making machine, the combination with a core bar having cores and a stripper plate having posts slidably mounted in said bar, of means for causing the plate to move relative to the bar to dislodge the cones, such means comprising a spring-supported stripper pin and a stop or knocker to act on the pin to cause it to re-act on the stripper plate and move it relative to the bar.

7. In a cone-making machine, the combination with a mold, a core bar, its cores and a plate, of a track adapted to hold the cores partly out of the mold and the plate away from the mold, another track adapted to position the plate against the mold face while the cores still remain substantially as before, and another track adapted to position the cores fully in the mold while the plate remains as last stated.

8. In a cone-making machine, the combination with a mold having cavities and a core bar having cores, a stripper plate slidable on the cores, rollers adapted to act on the core bar, and other rollers to act on the stripper plate, of a track on which the core bar roller rides to suspend the devices with the cores partially out of the cavities, another track against which the stripper plate rollers act to press the plate against the mold face without disturbing the core bar, and still another track adapted to act on the core bar rollers to press the cores fully into the cavities.

9. In a pastry baking machine, the combination of a mold member and a cooperating core; a stripper plate slidably mounted on the core and adapted to seal the space between the core and mold member, means for moving the stripper plate and core together away from the mold, means for partly returning the core to the mold and holding it partly out of the mold, means for first seating the stripper plate on the mold member, and another means for subsequently returning the core fully into the mold member.

10. In a pastry baking machine, the combination of a mold member having a flat top face and a cooperating core defining with the mold an annular space, a stripper slidably mounted on the core and having a flat annular face of slightly greater width than said annular space and adapted to close the annular space and seat a flat narrow ring on top of the mold member, means for raising the core and stripper together from the mold member, means for positively seating the narrow ring of the stripper on the mold member to close said annular space until the core is fully returned to the mold, and means for subsequently returning the core to the mold.

11. In a cone baking machine, the combination of a mold and a core therefor, a stripper plate slidable on the core and having a flat annular collar adapted to rest on top of the mold and seal the annular space between the core and mold, means for holding the core and stripper plate with the core partly in the mold to permit the escape of steam, means for seating the collar on the mold to seal said space, and another means for subsequently pressing the core fully into the mold to compress the batter therein.

12. In a cone baking machine, the combination of a mold member and a cooperating core, means movable with and relative to the core for sealing the annular space between the mold and core and for stripping the baked cone from the core, means for removing the core from the mold with the baked cone thereon, means for moving the said stripping means relative to the core to discharge the baked cone, a track for holding the core and stripping means partly returned to the mold to permit the initial escape of steam, and a second track for holding the core fully in the mold and the sealing means seated on the mold after the steam has escaped.

13. In a cone baking machine, the combination of a mold having a conical cavity therein, a conical core for said mold and having a cylindrical neck portion, a stripper slidable on said core and having a narrow flat annular surface adapted to seal the space between the mold and core and engage the top of the mold, means for returning the stripper and core loosely to the mold and means for pressing the core in the mold and the narrow annular shoulder against the top of the mold.

In testimony whereof, I affix my signature.

WEBSTER M. ROBERTS.